United States Patent [19]

Naganuma et al.

[11] Patent Number: 5,091,682
[45] Date of Patent: Feb. 25, 1992

[54] SCREW ADJUSTING APPARATUS

[75] Inventors: Soichi Naganuma, Neyagawa; Chihiro Nakamura, Moriguchi; Yoshio Kanata, Katano, all of Japan

[73] Assignee: Matsushita Electric Industrial Co., Ltd., Osaka, Japan

[21] Appl. No.: 651,620

[22] Filed: Feb. 7, 1991

[51] Int. Cl.[5] .......................................... G05B 11/01
[52] U.S. Cl. ..................... 318/560; 318/558; 318/652
[58] Field of Search ............... 318/560, 628, 638, 640, 318/652, 671, 558

[56] References Cited

U.S. PATENT DOCUMENTS 3,900,888  8/1975  Uchikoshi et al. .......... 318/653 X
4,996,615  2/1991  Iwanaga ...................... 360/104

Primary Examiner—Bentsu Ro
Attorney, Agent, or Firm—Wenderoth, Lind & Ponack

[57] ABSTRACT

A screw adjusting apparatus includes a positioning control device for outputting rotation instructions to a designated position based on a rotation detection signal; an image sensing section; a visual recognition section for processing a video signal outputted from the image sensing section so as to measure position of an object; a screw feeding amount calculating device for deciding a feeding amount of the screw so as to place the object at a predetermined position according to position information outputted from the visual recognition section and the information of the object which has been moved by contact between the screw and a tool; and an instruction control device for issuing instructions to the positioning control device based on a decided feeding amount of the screw.

1 Claim, 5 Drawing Sheets

SCREW ADJUSTING APPARATUS

BACKGROUND OF THE INVENTION

The present invention relates to a screw adjusting apparatus for adjusting the position of, for example, a magnetic head of a video tape recorder promptly and precisely by moving the magnetic head with the end of a screw.

Conventionally, an adjustment for moving the magnetic head using a screw mechanism depends much on an operator's visual sense. Therefore, there is a growing demand for the development of an automated screw adjusting apparatus capable of performing its function promptly and precisely.

An example of a conventional automated screw adjusting apparatus for adjusting the position of a magnetic head clamped to the cylinder of a video tape recorder is described below.

FIG. 6 is a sectional view showing the principal portions of the head adjusting section which clamps a head base to the cylinder of the video tape recorder by moving a screw vertically.

Referring to FIG. 6, the head adjusting section comprises: a rotary cylinder 1; a head base 2 clamped to the rotary cylinder 1; a head tip 3 mounted on the head base 2; a screw 4 which clamps the head base 2 to the rotary cylinder 1; a screw 5 which presses the head base 2 downward and provides a clearance between the head base 2 and the cylinder 1; and a bit 6 for transmitting the rotation of a motor to the screw 5.

According to the above head adjusting section, the initial position of the head tip 3 with respect to the axial direction of the cylinder 1 is visually detected. If there is a difference between the initial position of the head tip 3 and the predetermined position, the screw 5 is rotated a certain angle by a motor in order to move the head base 2. Then, the position of the head tip 3 is visually detected again. This operation is repeated until the position of the head tip 3 with respect to the predetermined position is within the tolerance.

In addition, before the bit 6 is removed from the screw 5, it is necessary to rotate the bit 6 reversely less than the backlash so that the bit 6 can be smoothly removed from the screw 5. As a result, the screw 5 is released from the pressing force of the bit 6 and consequently, the position of the head tip 3, namely, the head base 2 is moved upward. This phenomenon is hereinafter referred to as "spring-back". Therefore, it is necessary to detect the position of the head tip 3 visually again. If the position of the head tip 3 with respect to the predetermined position is out of the tolerance, the operation for moving the head base 2 downward is repeatedly carried out.

According to this conventional method, since the adjustment amount of the head tip is slight, the rotational amount of the screw 5 per step is slight. If the clearance between the head base 2 and the cylinder 1 is great, many steps are required until the clearance between the head base 2 and the cylinder 1 is within the tolerance. Therefore, it takes much time to complete the positioning operation.

Further, according to the conventional method, it is difficult to rotate the screw 5 promptly because the spring-back amount of the head tip 3 is nonuniform. In the worst case, the screw 5 cannot be fed to the predetermined position.

SUMMARY OF THE INVENTION

It is the essential object of the present invention to provide a screw adjusting apparatus capable of feeding a screw promptly and accurately in order to provide a clearance between the head base and a rotary cylinder.

In accomplishing this and other objects of one aspect of the present invention, there is provided a screw adjusting apparatus comprising: a positioning control means for outputting rotation instructions to a designated position based on a rotation detection signal; an image sensing section; a visual recognition section for processing a video signal outputted from the image sensing section so as to measure position of an object; screw feeding amount calculating means for deciding a feeding amount of the screw so as to place the object at a predetermined position according to position information outputted from the visual recognition section and the information of the object which has been moved by contact between the screw and a tool; and instruction control means for issuing instructions to the positioning control means based on a decided feeding amount of the screw.

According to the above construction, the screw is rotated by driving means such as a motor and the screw feeds the head base. As a result, the position of the head tip is changed. Using an effective screw feeding amount calculating means for deciding the feeding amount of the screw based on position information of the head tip detected by the visual recognition section and considering the influence of the spring-back of the head tip, the position control of the screw can be carried out accurately and promptly.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
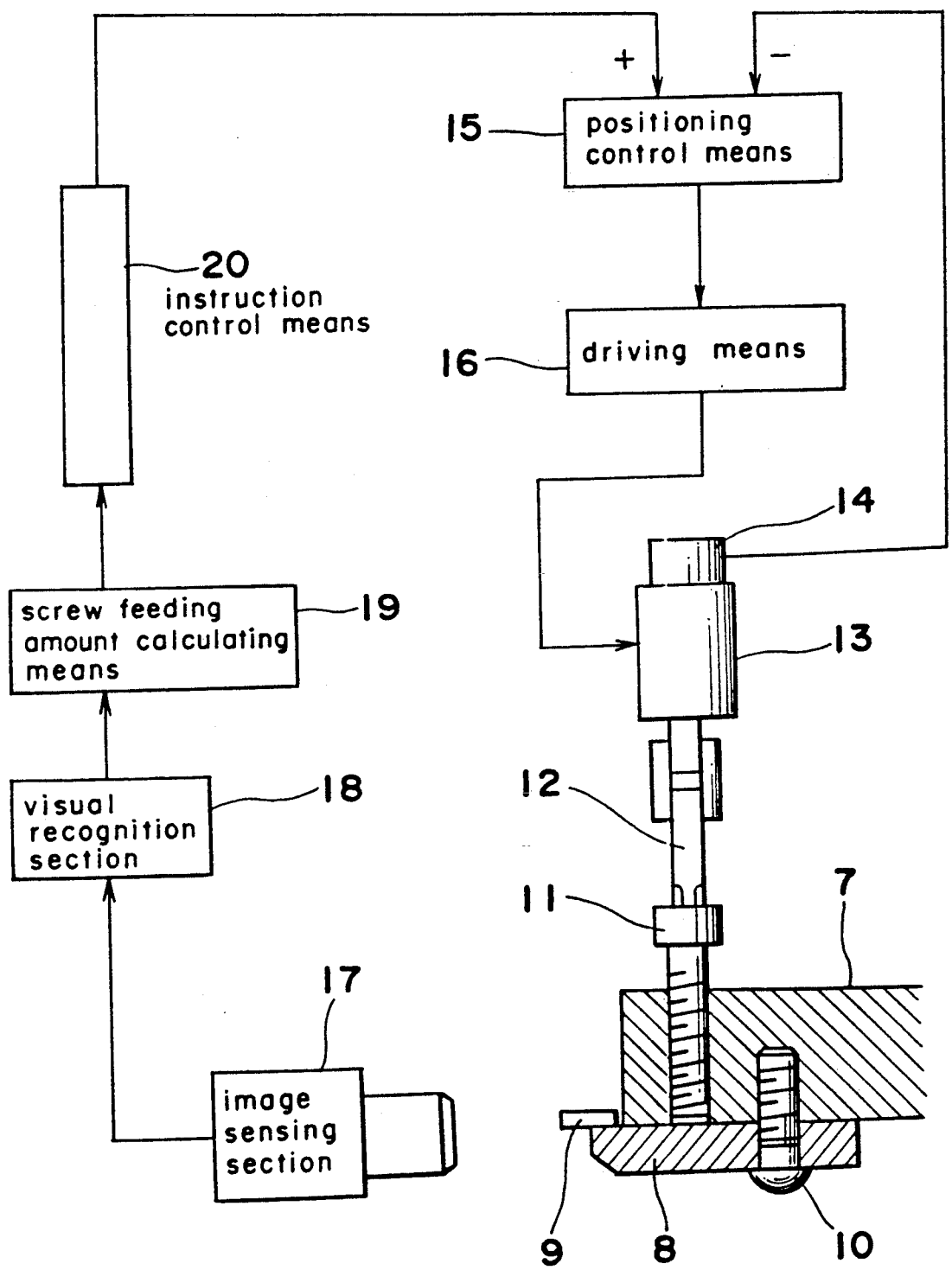
FIG. 1 is a block diagram showing the construction of a screw adjusting apparatus according to an embodiment of the present invention.

FIG. 1 is a block diagram showing a screw adjusting apparatus according to an embodiment of the present invention. The apparatus comprises: a main body 7, a head base 8 clamped to the main body 7, a head tip 9 mounted on the head base 8, a screw 10 clamping the head base 8 to the main body 7, a screw 11 pressing the head base 8 downward and providing a clearance between the head base 8 and the main body 7, a bit 12 connected to the screw 11 and transmitting the rotation of a motor 13 to the screw 11, the motor 13 for rotating the screw 11 via the bit 12, a rotation detector 14 for detecting the rotation condition of the motor 13, a positioning control means 15 for accumulating signals transmitted from the rotation detector 14 and instruction signals to be transmitted to a motor driving means 16, the motor driving means 16 for driving the motor 13 according to the instructions of the positioning control means 15, an image sensing section 17 for sensing the image of the head tip 9, a visual recognition section 18 for processing a video signal outputted by the image sensing section 17 so as to measure the position of the head tip 9, screw feeding calculating means 19 for calculating the movement amount of the screw 11 with respect to a target value according to the position of the head tip 9 and spring-back amount obtained by the information transmitted from the visual recognition section 18, and instruction control means 20 for issuing instructions to the positioning control means 15 so as to control the motor 13 based on the movement amount of the screw 11 determined by the screw feeding calculating means 19.

Referring to FIGS. 2, 3, 4, and 5, the detailed description of the operation of the apparatus and the screw feeding calculating means 19 is made below.

First, the initial position of the head tip 9 is measured by the visual recognition section 18 at step #1. The movement amount of the screw 11 with respect to the target value is decided by the screw feeding calculating means 19 at step #2. Then, a rough positioning adjustment is repeatedly carried out. That is, the motor 13 is rotated by the number of pulses corresponding to the movement amount of the screw 11 until the program goes into the rough positioning adjustment completion range at steps #3 and 4. Thereafter, after the position of the head tip 9 is detected at step #5, the program goes into the fine position adjustment range in which the motor 13 is rotated according to the predetermined number of pulses at steps #5, 6, and 7.

Figure 2:
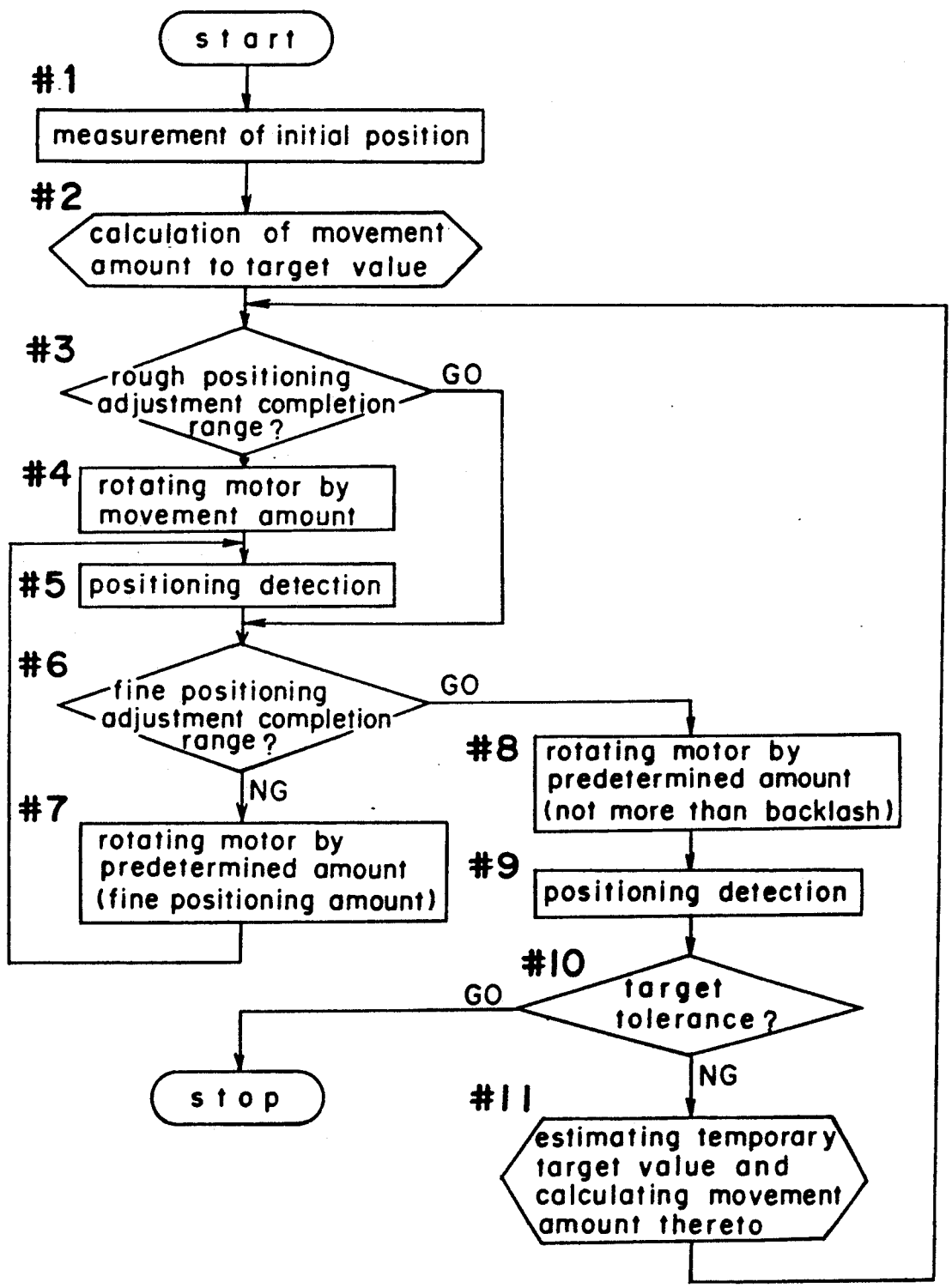
FIG. 2 is the flowchart of the adjusting operation according to the embodiment of the present invention.
Figure 3:
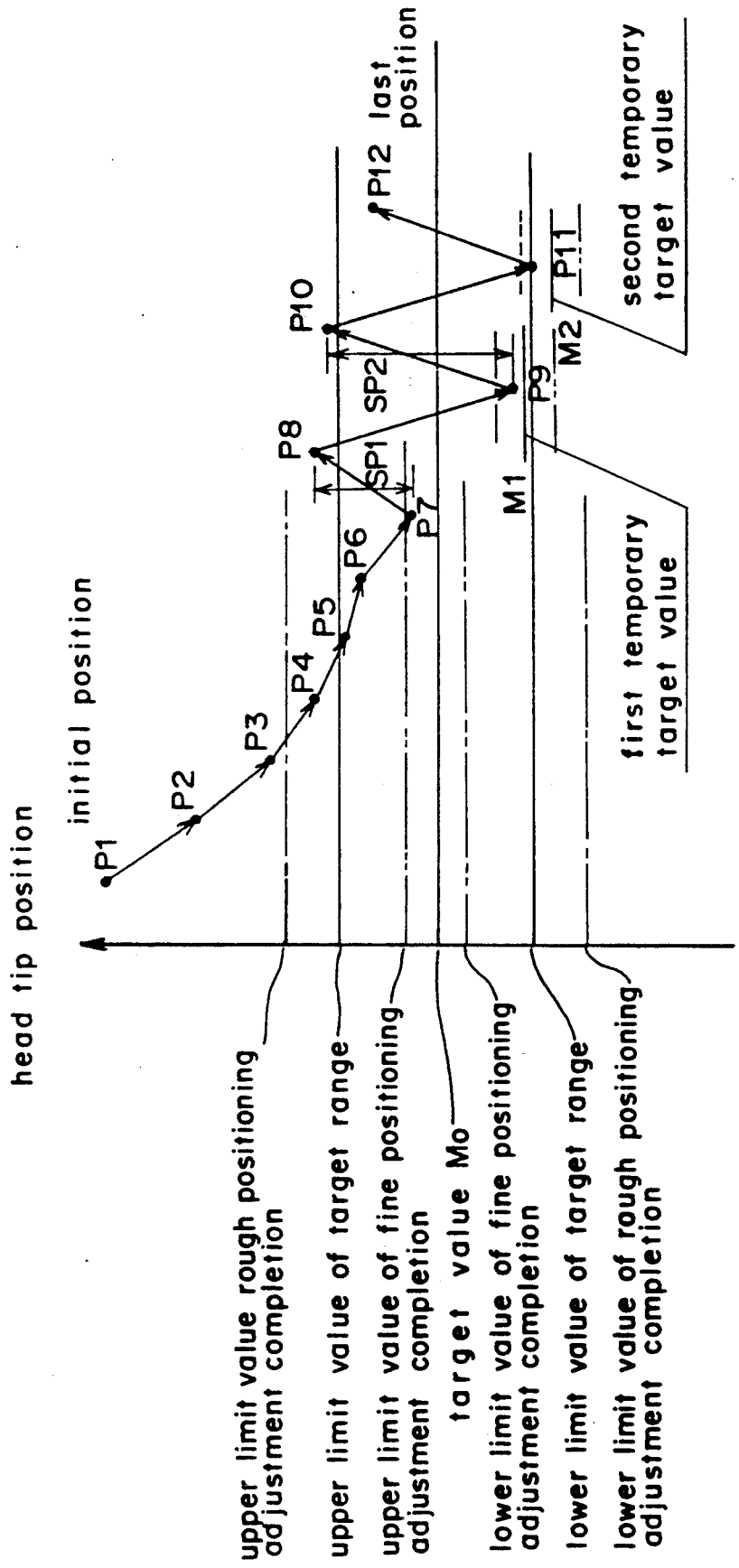
FIGS. 3 through 5 are chart diagrams of the adjusting operation.

Referring in particular to FIGS. 2 and 3, in the fine positioning adjustment range, the bit 12 is reversely rotated not more than the angle corresponding to the backlash at step #8. Then, the position of the head tip 9 is detected at step #9. Thereafter, if the moved amount of the screw 11 is in the target tolerance at step #10, the fine positioning adjustment terminates. If the moved amount of the screw 11 is out of the target tolerance at step #10, a temporary target value is set in consideration of the influence of the spring-back of the head tip 9 so as to decide the movement amount of the head base 8 based on the temporary target value at step #10. Then, the program returns to the rough or fine positioning adjustment range.

The algorithm for setting the temporary target value is described below. Supposing that $H_1$ is the position of the head tip 9 in the fine positioning adjustment completion range with respect to the first temporary target; $H'_1$ is the height of the head tip 9 after the spring-back takes place; $SP_1$ is spring-back amount; $M_0$ is the target value; and $M_1$ is the i-th temporary target value, $SP_1$ is expressed as follows:

$$SP_1 = H'_1 - H_1$$

Normally, the temporary target value is set by differentiating the spring-back amount of the current time from that of the previous time. But according to the embodiment, the temporary target value is set in consideration of previous two-time spring-back amounts $SP_{(n-2)}$ and $SP_{(n-1)}$ in order to prevent repeating the same generation.

Assuming that the spring-back occurs twice; one of the heights of the head tip 9 is more than the upper limit of the target range; and the other is less than the lower limit thereof, it is estimated that the temporary target position is intermediate between the heights of the head tip 9 before the previous two-time spring-backs occur. Therefore, the temporary target value is set in consideration of the heights of the head tip 9 before the previous two-time spring-backs occur, namely $H_{(n-2)}$ and $H_{(n-1)}$ and after the previous two-time spring-backs occur, namely, $H'_{(n-2)}$ and $H'_{(n-1)}$.

Expressing the above content in an equation supposing that the upper limit value of the target range is U and the lower limit value thereof is L, when $H'_{(n-2)}, H'_{(n-1)} \leq L$ or $H'_{(n-2)}, H'_{n-1)} \geq U$, $$M_n = f(SP_{(n-2)}, SP_{(n-1)}) \tag{1}$$

when $H'_{(n-2)} > L$, $H'_{(n-1)} < U$ or $H'_{(n-2)} < L$, $H'_{(n-1)} > U$ $$M_n = g(H_{(n-2)}, H_{(n-1)}, H'_{(n-2)}, H'_{(n-1)}) \tag{2}$$

According to the embodiment, equations (1) and (2) are expressed as follows:

$$f(SP_{(n-2)}, SP_{(n-1)}) = \begin{cases} M_0 - (SP_{(n-1)}/SP_{(n-2)})SP_{(n-1)} & (n \geq 2) \\ M_0 - SP_0 & (n = 1) \end{cases} \tag{1}'$$

$$g(H_{(n-2)}, H_{(n-1)}, H'_{(n-2)}, H'_{(n-1)}) = \tag{2}'$$

$$\frac{|H'_{(n-1)} - M_0|H_{(n-2)} + |H'_{(n-2)} - M_0|H_{(n-1)}}{|H'_{(n-1)} - M_0| + |H'_{(n-2)} + M_0|} (n \geq 2)$$

Figure 4:
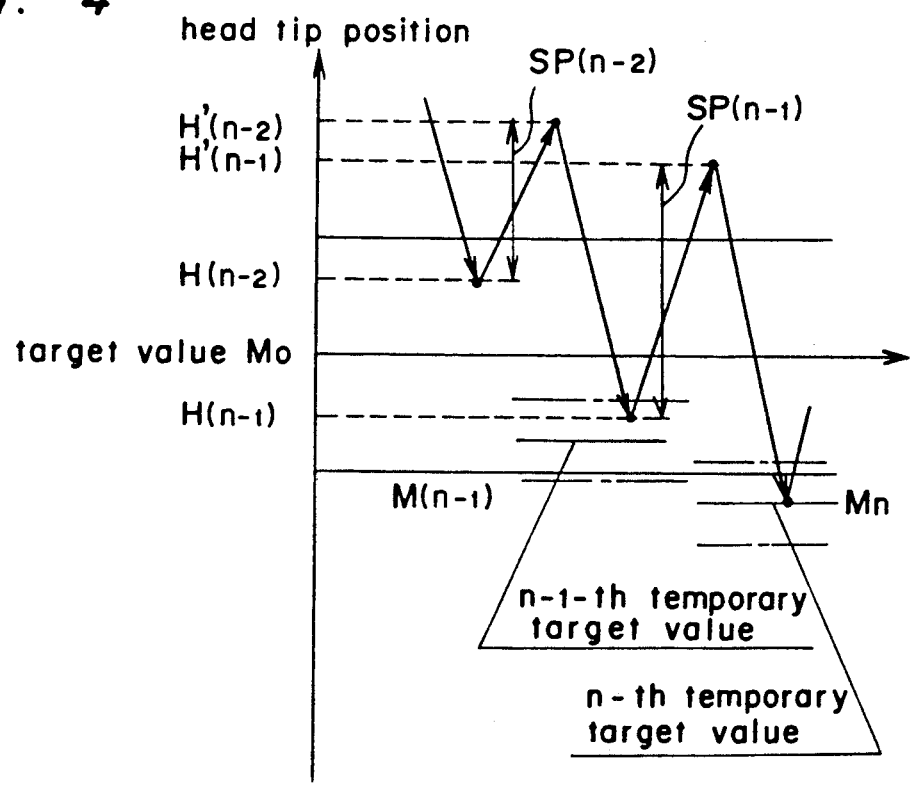
Figure 5:
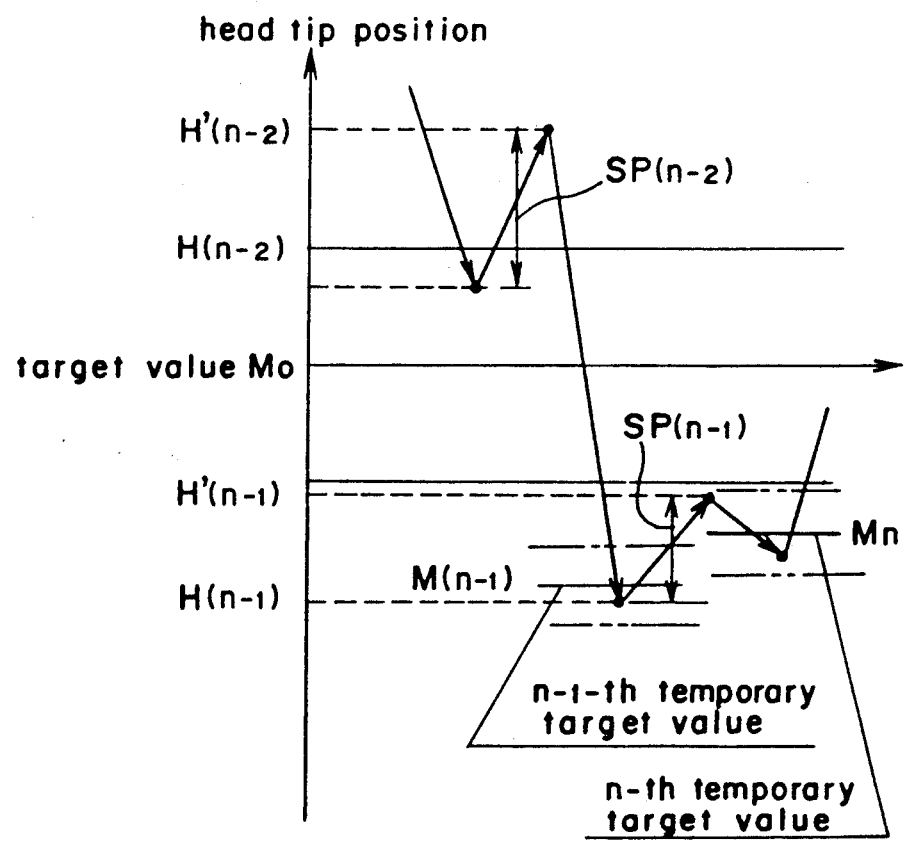
Figure 6:
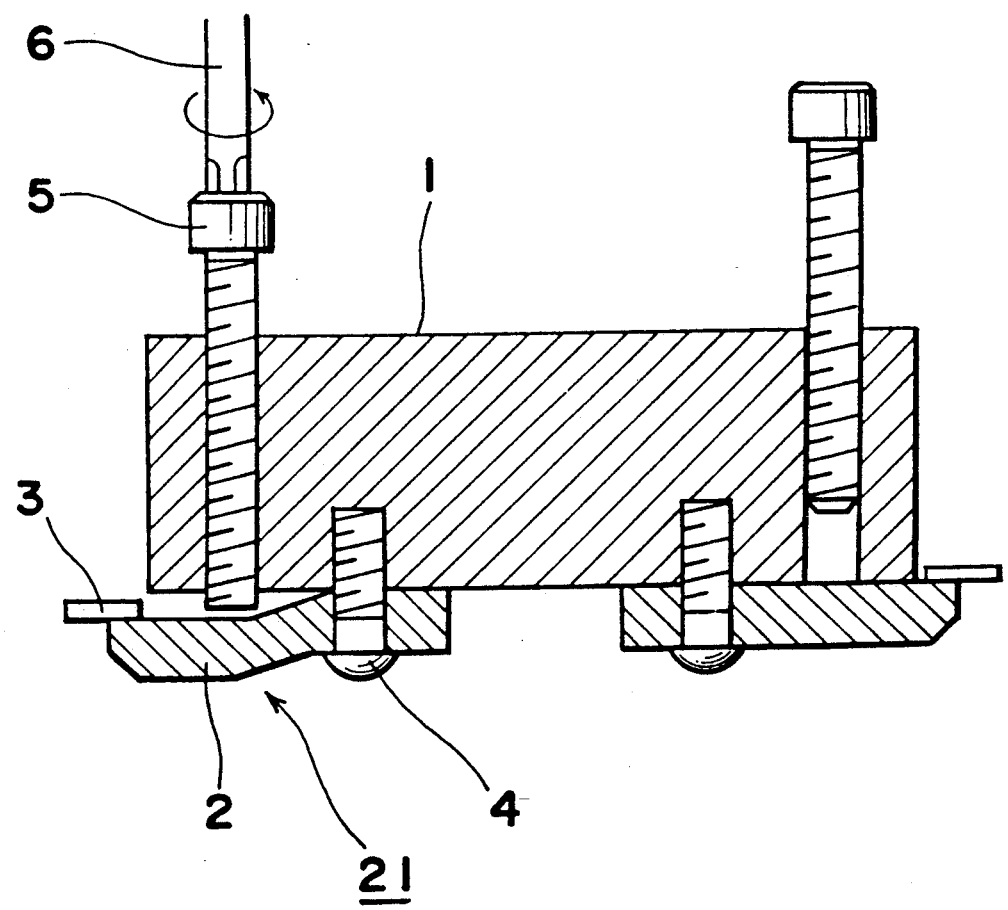
FIG. 6 is a sectional view showing the head adjusting section of the conventional art.

FIGS. 4 and 5 show the operation charts of the above.

The apparatus according to one embodiment of the present invention comprises: the screw 11 engaging the main body; the tool, namely, the bit 12 for transmitting the rotation of the motor 13 to the screw 11; the object, namely, the head tip 9 mounted on the main body and the position of which is adjusted in contact with the screw 11; the motor 13 for rotating the tool, namely, the bit 12; the driving means 16 for driving the motor 13; the rotation detecting means 14 mounted on the motor 13; the positioning control means 15 for receiving a signal outputted from the rotation detecting means 14 and outputting rotation instructions to a designated position; the image sensing section 17 for sensing the image of the object, namely, the head tip 9; the visual recognition section 18 for processing a video signal outputted from the image sensing section 17 so as to measure the position of the head tip 9; the screw feeding amount calculating means 19 for deciding the feeding amount of the screw 11 so as to place the head tip 9 at a predetermined position according to position information outputted from the visual recognition section 18 and the information of the head tip 9 which has been moved by the contact between the screw 11 and the bit 12; and the instruction control means 20 for issuing instructions to the positioning control means 15 based on the decided feeding amount of the screw. Therefore, the screw feeding amount can be adjusted by switching the rough positioning adjustment to the fine positioning adjustment and in consideration of the influence of the spring-back. Thus, the clearance between the head base 8 and the main body 7 can be adjusted promptly and precisely.

As apparent from the foregoing description, based on the information generated by the visual recognition section and owing to the provision of the screw feeding amount calculating means, the clearance between the head base 8 and the main body 7 can be provided promptly and precisely by switching the rough positioning adjustment of the screw to the fine positioning adjustment thereof and taking into consideration the influence of the spring-back of the head tip.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A screw adjusting apparatus comprises:

a positioning control means for outputting rotation instructions to a designated position based on a rotation detection signal;

an image sensing section;

a visual recognition section for processing a video signal outputted from the image sensing section so as to measure position of an object;

screw feeding amount calculating means for calculating a feeding amount of a screw so as to place the object at a predetermined position according to position information outputted from the visual recognition section and the information of the object which has been moved by contact between the screw and a tool; and instruction control means for issuing instructions to the positioning control means based on a calculated feeding amount of the screw.

* * * * *

UNITED STATES PATENT AND TRADEMARK OFFICE
CERTIFICATE OF CORRECTION

PATENT NO. : 5,091,682

DATED : February 25, 1992

INVENTOR(S) : Soichi NAGANUMA et al.

It is certified that error appears in the above-identified patent and that said Letters Patent is hereby corrected as shown below:

On the title page:
In the heading, after line [22] and before line [51], insert:

[30]  Foreign Application Priority Data
      February 9, 1990 [JP] 2-30202

Signed and Sealed this

Seventh Day of September, 1993

Attest:

BRUCE LEHMAN

Attesting Officer     Commissioner of Patents and Trademarks